(12) United States Patent
Uematsu et al.

(10) Patent No.: US 10,355,565 B2
(45) Date of Patent: Jul. 16, 2019

(54) METHOD OF MANUFACTURING STATOR FOR MOTOR

(71) Applicant: FANUC CORPORATION, Yamanashi (JP)

(72) Inventors: Hidetoshi Uematsu, Yamanashi (JP); Akihiro Hosoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/816,467

(22) Filed: Nov. 17, 2017

(65) Prior Publication Data

US 2018/0152084 A1 May 31, 2018

(30) Foreign Application Priority Data

Nov. 25, 2016 (JP) .................................. 2016-229477

(51) Int. Cl.
*H01F 3/02* (2006.01)
*H02K 1/02* (2006.01)
(Continued)

(52) U.S. Cl.
CPC ............ *H02K 15/022* (2013.01); *H02K 1/14* (2013.01); *H02K 15/02* (2013.01); *H01F 3/02* (2013.01);
(Continued)

(58) Field of Classification Search
CPC ....... H01F 3/02; H01F 41/0233; H02K 15/02; H02K 15/022; H02K 1/02; H02K 1/14; H02K 2213/03
See application file for complete search history.

(56) References Cited

U.S. PATENT DOCUMENTS 6,892,439 B1 * 5/2005 Neal ................... H02K 1/146
29/596
7,002,277 B2 2/2006 Yamamoto et al.
(Continued)

FOREIGN PATENT DOCUMENTS

CN 1324509 A 11/2001
CN 1819402 A 8/2006
(Continued)

OTHER PUBLICATIONS

An Office Action issued by the Chinese Patent Office dated Nov. 2, 2018, which corresponds to Chinese Patent Application No. 201711182264.3 and is related to U.S. Appl. No. 15/816,467; with English language translation.
(Continued)

*Primary Examiner* — Minh N Trinh
(74) *Attorney, Agent, or Firm* — Studebaker & Brackett PC

(57) ABSTRACT

In a method for manufacturing a stator of the present invention, positions of stamping out the first stator core and the second stator core are respectively set so that an angular difference between respective rolling directions thereof becomes 360 degrees÷(4×motor pole pair number), when laminating the first stator core which is not circular stamped out from a first electromagnetic steel sheet, and the second stator core which is not circular stamped out from a second electromagnetic steel sheet. For the second stator core, orientation of a shortest segment among virtual segments linking opposite sides or diagonals which pass through a center thereof is not orthogonal to the rolling direction, and at least two are stamped out alongside in a width direction.

3 Claims, 5 Drawing Sheets

(51) Int. Cl.
  *H02K 1/14* (2006.01)
  *H01F 41/02* (2006.01)
  *H02K 15/02* (2006.01)

(52) U.S. Cl.
  CPC ............ *H01F 41/0233* (2013.01); *H02K 1/02* (2013.01); *H02K 2213/03* (2013.01)

(56) References Cited

U.S. PATENT DOCUMENTS

| | | | |
|---|---|---|---|
| 7,298,064 B2 | 11/2007 | Yamamoto et al. | |
| 2005/0023925 A1 | 2/2005 | Yamamoto et al. | |
| 2006/0163967 A1 | 7/2006 | Yamamoto et al. | |
| 2017/0229929 A1* | 8/2017 | Fahrenbach | H02K 1/02 |
| 2018/0152084 A1* | 5/2018 | Uematsu | H02K 15/02 |

FOREIGN PATENT DOCUMENTS

| | | |
|---|---|---|
| CN | 103415986 A | 11/2013 |
| JP | H10-066283 A | 3/1998 |
| JP | 3865734 B2 | 1/2007 |
| JP | 4498154 B2 | 7/2010 |
| JP | 2012-170222 A | 9/2012 |
| JP | 2012-178920 A | 9/2012 |
| JP | 2014-168329 A1 | 9/2014 |
| JP | 2015-167454 A1 | 9/2015 |
| JP | 2015-181344 A | 10/2015 |

OTHER PUBLICATIONS

An Office Action issued by the Japanese Patent Office dated Feb. 27, 2018, which corresponds to Japanese Patent Application No. 2016-229477 and is related to U.S. Appl. No. 15/816,467.

* cited by examiner

PRIOR ART

METHOD OF MANUFACTURING STATOR FOR MOTOR

This application is based on and claims the benefit of priority from Japanese Patent Application No. 2016-229477, filed on 25 Nov. 2016, the content of which is incorporated herein by reference.

BACKGROUND OF THE INVENTION

Field of the Invention

The present invention relates to a method of manufacturing stators which manufactures a stator cores which are laminated to form the stator of a motor, from electromagnetic steel sheets extending in a rolling direction.

Related Art

Conventionally, the stator for a motor is manufactured by laminating stator cores stamped out from an electromagnetic steel sheet. For example, as shown in FIG. 5A, substantially square stator cores 100 are stamped out from an electromagnetic steel sheet extending in a rolling direction in a predetermined width d0, and a stator is formed by laminating the stator cores 100. FIG. 5A shows an example in which pilot pin holes 5 for inserting pilot pins are formed in the electromagnetic steel sheet 19.

The electromagnetic steel sheet serving as the material for the stator core has magnetic anisotropy whereby the magnetic permeability differs between the rolling direction thereof and a direction orthogonal to the rolling direction. The magnetic anisotropy of the electromagnetic steel sheet becomes the cause of torque ripple during rotation by causing a difference in the generation rate of magnetic flux to occur, and becomes the cause of torque cogging. FIG. 5B shows an example taking into consideration malfunction caused by magnetic anisotropy of the electromagnetic steel sheet, and sloping the orientation of the stator core 101 relative to the rolling direction. Patent Document 1 and Patent Document 2 are given as documents describing this type of magnetic anisotropy. Patent Document 1 and Patent Document 2 describe methods of suppressing torque cogging by stamping out the stator cores to slope relative to the rolling direction, and overlapping to be shifted.

In addition, Patent Document 3 and Patent Document 4 are given as examples of stamping out stator cores in multiple rows from electromagnetic steel sheets. Patent Document 3 describes, in regards to technology that arranges and stamps out at least two iron core plates in the width direction of the processing member, welding a trailing end of a previous processing member and a starting end of a subsequent processing member upon the supply of processing members. Patent Document 4 describes technology that arranges one core piece group arranged in a zig-zag pattern fully in the width of a strip, while maintaining the pilot pin holes, and improves material yield rate. Patent Document 3 and Patent Document 4 are both premised on using pilot pins.

Patent Document 1: Japanese Patent No. 3865734
Patent Document 2: Japanese Patent No. 4498154
Patent Document 3: Japanese Unexamined Patent Application, Publication No. 2014-168329
Patent Document 4: Japanese Unexamined Patent Application, Publication No. 2015-167454

SUMMARY OF THE INVENTION

However, with a stator core that is not circular, compared to case of the stator cores being aligned in the rolling direction as shown in FIG. 5A, the case of the stator cores slanting relative to the rolling direction as shown in FIG. 5B has a greater amount of scrap of the electromagnetic steel sheet after cutting out the stator core from the electromagnetic steel sheet, and thus leads to a cost increase. As shown in Patent Document 3 and Patent Document 4, in order to decrease the amount of scrap after the stator cores are stamped out, it has also been considered to arrange the stator cores in multiple rows. However, these are structures requiring portions for arranging pilot pins formed in the electromagnetic steel sheet, and a method has been demanded for effectively reducing the amount of scrap by a core shape not premised on these structures. In addition, even if trying to form the stator cores by arranging in multiple rows, there is a risk of the influence of magnetic anisotropy occurring due to the rolling direction of the electromagnetic steel sheet by simply arranging in multiple rows.

The present invention has an object of providing a method for manufacturing stators that can effectively reduce the amount of scrap of electromagnetic steel sheet relative to production amount, while suppressing the influence of magnetic anisotropy caused by the rolling direction of the electromagnetic steel sheet.

A first aspect of the present invention relates to a method for manufacturing a stator (e.g., the stator 1 described later) that manufactures a first stator core (e.g., the first stator core 10 described later) and a second stator core (e.g., the second stator core 11, 12 described later) which are laminated to form the stator of a motor, from an electromagnetic steel sheet (e.g., the first electromagnetic steel sheet 20, second electromagnetic steel sheet 21 described later) which extends in a rolling direction, in which positions of stamping out the first stator core and the second stator core are respectively set so that an angular difference between respective rolling directions thereof becomes 360 degrees÷(4×motor pole pair number), when laminating the first stator core which is not circular stamped out from a first electromagnetic steel sheet (e.g., the first electromagnetic steel sheet 20 described later), and the second stator core which is not circular stamped out from a second electromagnetic steel sheet (e.g., the second electromagnetic steel sheet 21 described later), in which for at least either one among the first stator core and the second stator core, orientation of a shortest segment (e.g., the segment d1 described later) among virtual segments linking opposite sides or diagonals which pass through a center thereof is not orthogonal to the rolling direction, and at least two are stamped out alongside in a width direction.

According to a second aspect of the present invention, in the method for manufacturing a stator as described in the first aspect, each of the shortest segments of the first stator cores or the second stator cores which are adjacent in the width direction may be parallel.

According to a third aspect of the present invention, in the method for manufacturing a stator as described in the first or second aspect, each of the shortest segments of the first stator cores or the second stator cores which are adjacent in the width direction may be positioned on the same line.

In addition, a fourth aspect of the present invention relates to a method for manufacturing a stator (e.g., the stator 1 described later) that manufactures stator cores (e.g., the stator core 15, 16 described later) to be laminated to form the stator of a motor from an electromagnetic steel sheet (e.g., the electromagnetic steel sheet 22 described later) extending in a rolling direction, in which positions of stamping out the stator cores are set so that an angular difference between respective rolling directions becomes 360 degrees÷(4×motor pole pair number), when laminating the stator core which is not circular stamped out from an electromagnetic steel sheet, and the stator core in a state by turning upside down the stator core stamped out from the electromagnetic steel sheet, and in which, for the stator core, orientation of a shortest segment (e.g., the segment d1 described later) among virtual segments linking opposite sides or diagonals which pass through a center thereof is not orthogonal to the rolling direction, and at least two are stamped out alongside in a width direction.

According to a fifth aspect of the present invention, in the method for manufacturing a stator as described in the fourth aspect, each of the shortest segments in the stator cores which are adjacent in a width direction may be parallel.

According to a sixth aspect of the present invention, in the method for manufacturing a stator as described in the fourth or fifth aspect, each of the shortest segments in the stator cores which are adjacent in a width direction m positioned on the same line.

According to the method of manufacturing stators of the present invention, it is possible to effectively reduce the scrap amount of electromagnetic steel sheet relative to the production amount, while suppressing the influence of magnetic anisotropy caused by the rolling direction of the electromagnetic steel sheet.

DETAILED DESCRIPTION OF THE INVENTION

Hereinafter, preferred embodiments of the present invention will be explained while referencing the drawings.

First, a method of manufacturing stators of a first embodiment that forms a stator 1 by laminating the two types of stator cores of a first stator core and a second stator core (refer to FIG. 1C) will be explained.

Figure 1A:
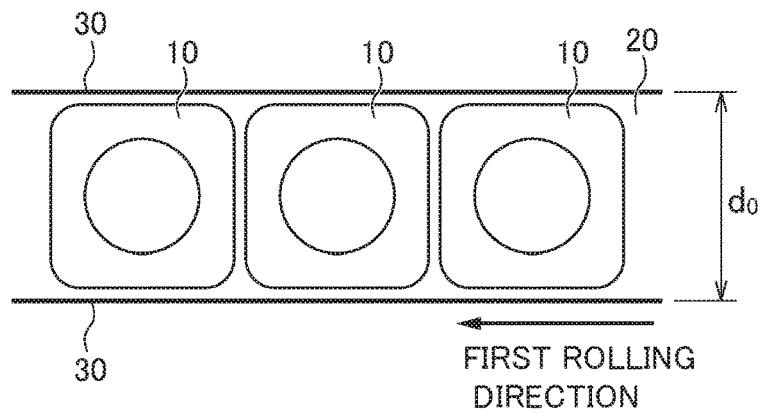
FIG. 1A is a view illustrating stamping out of first stator cores of a first embodiment.
Figure 1B:
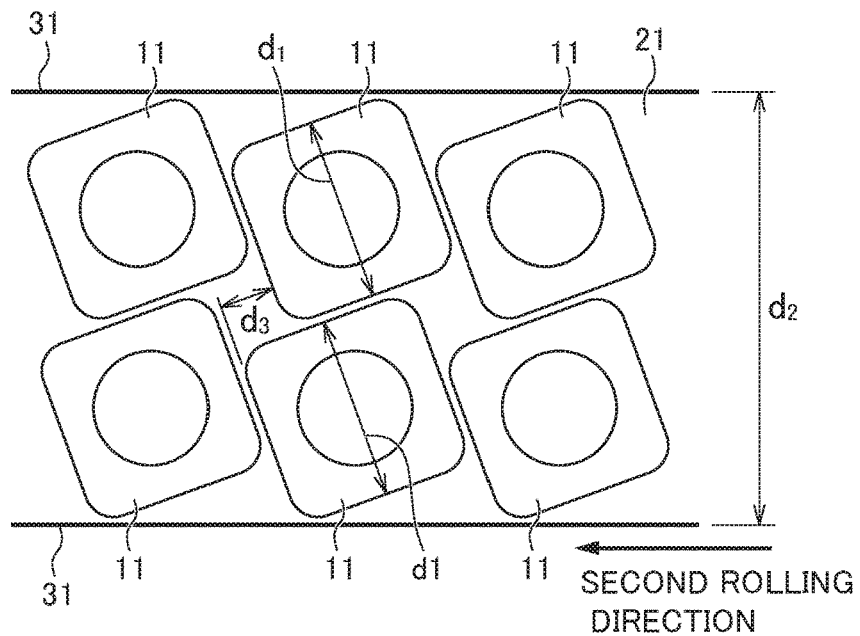
FIG. 1B is a view illustrating stamping out of second stator cores of the first embodiment.

FIG. 1A is a view illustrating stamping out of first stator cores 10 of the first embodiment. FIG. 1B is a view illustrating stamping out of second stator cores 11 of the first embodiment.

As shown in FIG. 1A and FIG. 1B, the first stator core 10 and second stator core 11 both become substantially square shapes, which are not circular viewing in the laminating direction.

The first stator core 10 is formed by stamping out a first electromagnetic steel sheet 20 which is a hoop material. The second stator core 11 is formed by stamping out a second electromagnetic steel sheet 21, which is a hoop material, and is wider in width than the first electromagnetic steel sheet 20. The first stator core 10 and second stator core 11 are the same shape, and the stator 1 is formed by a plurality of the first stator cores 10 and second stator cores 11 being laminated.

As shown in FIG. 1A, the locations on the first electromagnetic steel sheet 20 at which the first stator cores 10 are stamped out are aligned in one row in a first rolling direction of the first electromagnetic steel sheet 20. Among the segments linking opposite sides or diagonals by passing through the center of the stator core, when defining the segment having the shortest length as segment d1, the first stator core 10 becomes a positional relationship in which the orientation of the segment d1 is orthogonal to the first rolling direction of the first electromagnetic steel sheet 20. Then, the length between both sides 30 of the first electromagnetic steel sheet 20, i.e. width d0 of the first electromagnetic steel sheet 20, is set to be longer than the segment d1. In the present embodiment, the first rolling direction of the first electromagnetic steel sheet 20 and the extending direction of both sides 30 of the first electromagnetic steel sheet 20 become a parallel positional relationship. In the first electromagnetic steel sheet 20, the segment d1 of the first stator core 10 is considered to be directed in a direction orthogonal to the extending direction of the both sides 30.

As shown in FIG. 1B, the locations at which the second stator cores 11 are stamped out in the second electromagnetic steel sheet 21 are aligned in two rows in the second rolling direction of the second electromagnetic steel sheet 21. The stator cores 11 fall into two rows in the length between the both sides 31 of the second electromagnetic steel sheet 21, i.e. between the width d2 of the second electromagnetic steel sheet 21.

The second stator core 11 is stamped out so that the orientation of the segment d1 thereof slants relative to an orthogonal direction to the second rolling direction of the second electromagnetic steel sheet 21. For each of the second stator cores 11 stamped out in the second electromagnetic steel sheet 21, the orientations of the segments d1 thereof become a parallel positional relationship.

In the first embodiment, the cut-out positions of the second stator cores 11 are set so that the segments d1 of the adjacent second stator cores 11 in the width direction are not on the same line. In other words, the adjacent second stator cores 11 in the width direction are arranged to be offset by d3 in a direction orthogonal to the direction in which the segment d1 is directed.

Figure 1C:
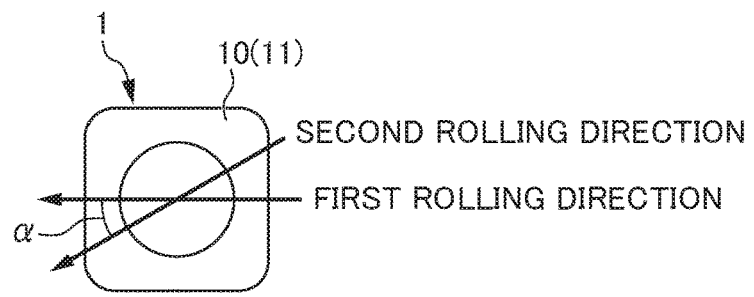
FIG. 1C is a view illustrating the relationship between the stator cores and the rolling directions of the first embodiment.

FIG. 1C is a view illustrating the relationship between the stator cores and rolling directions in the first embodiment. The first rolling direction in FIG. 1C is the rolling direction of the first electromagnetic steel sheet 20 when laminating the first stator cores 10, and the second rolling direction is the rolling direction of the second electromagnetic steel sheet 21 when laminating the second stator cores 11.

As shown in FIG. 1C, when laminating the first stator cores 10 and second stator cores 11, the first rolling direction and second rolling direction passing through the center of the stator 1 intersect with a predetermined angular difference α. The predetermined angular difference α is set by 360°÷(4×motor pole pair number). The slope of the segment d1 of the second stator core 11 relative to the width direction of the second electromagnetic steel sheet 21 is set so that this angular difference α is produced. For example, in the case of the pole pair number consisting of S poles and N poles being three, the orientation of the segment d1 of the second stator core 11 is set so that the angular difference becomes 30°. The angular difference α can be referred to as the angular difference between the rolling directions of each stator core relative to the rotor pole position.

By laminating the first stator cores 10 and second stator cores 11 to gather in the same direction, the first rolling direction of the first electromagnetic steel sheet 20 and second rolling direction of the second electromagnetic steel sheet 21 become a arrangement relationship intersecting at the angular difference α. It is thereby possible to produce a stator for a motor that can effectively suppress the influence of magnetic anisotropy of the rolling direction.

In the method for manufacturing the stator 1 of the first embodiment explained above, the positions of stamping out the first stator cores 10 and second stator cores 12 are respectively set so that the angular difference α between the first rolling direction and second rolling direction becomes 360°÷(4×motor pole pair number) when laminating the first stator core 10 which is not circular stamped out from the first electromagnetic steel sheet 20, and the second stator core 11 which is not circular stamped out from the second electromagnetic steel sheet 21. For the second stator cores 11, among the virtual segments linking opposite sides or diagonals passing through the center thereof, the orientation of the shortest segment d1 is not orthogonal relative to the second rolling direction, and at least two are stamped out alongside in the width direction.

Figure 5A:
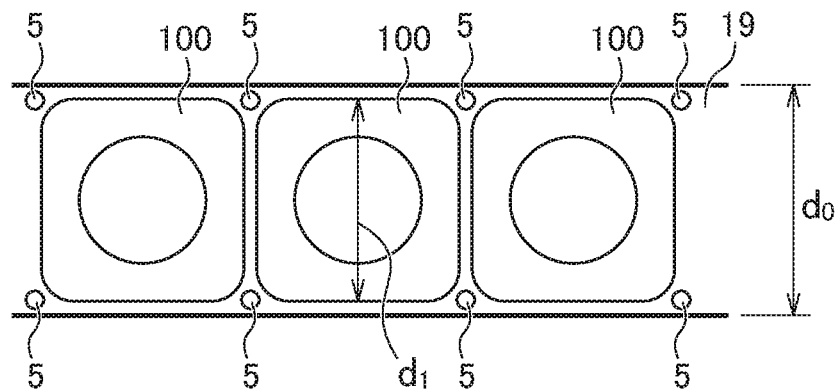
FIG. 5A is a view illustrating stamping out of conventional stator cores.
Figure 5B:
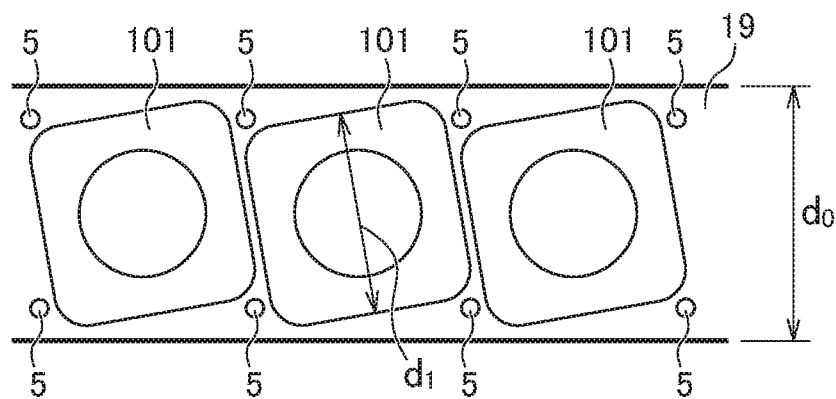
FIG. 5B is a view illustrating stamping out of conventional stator cores.

It is thereby possible to suppress the scrap amount of second electromagnetic steel sheet 21 relative to the production amount of the second stator cores 11, compared to a case of stamping out all stator cores along one row in the rolling direction of the electromagnetic steel sheet (refer to FIGS. 5A and 5B), and thus possible to realize a reduction in manufacturing cost. In addition, due to changing the ways of stamping out of the stator cores between the first electromagnetic steel sheet 20 and the second electromagnetic steel sheet 21, it is not necessary to make the stamped out shapes differ in the same electromagnetic steel sheet. It is possible to manufacture a high-quality stator 1 with good manufacturability formed at the angular difference α suppressing the influence of magnetic anisotropy caused by the first rolling direction and second rolling direction, when laminating the first stator cores 10 and second stator cores 11.

In addition, in adjacent second stator cores 11 in the width direction of the first embodiment, each of the shortest segments d1 of the second stator core 11 become a parallel positional relationship.

It is thereby possible to narrow the width of the second electromagnetic steel sheet 21 by aligning the orientations of the second stator cores 11, and it is possible to manufacture more of the second stator cores 11 from a limited region.

It should be noted that, although the segment d1 of the first stator core 10 is directed in a direction orthogonal to the first rolling direction in the first embodiment, it is not limited to this configuration. For at least either one of the first stator cores 10 and second stator cores 11, it is sufficient so long as being a configuration in which the orientation of the segment d1 is not orthogonal to the rolling direction, and stamped out alongside in at least two rows in the width direction. For example, for the first stator core 10, it is possible to establish as a configuration in which the orientation of the segment d1 is not orthogonal to the first rolling direction, and is stamped out alongside in at least two rows in the width direction, in accordance with the configuration of the motor such as the shapes of the rotor and stator, and the number of pole pairs. In this way, the configuration of the first embodiment can be modified as appropriate according to the situation.

Embodiments differing from the first embodiment will be explained. It should be noted that, in the following explanation, the same reference symbols are assigned to configurations which are similar to configurations that have already been explained, and explanations thereof may be omitted.

Figure 2A:
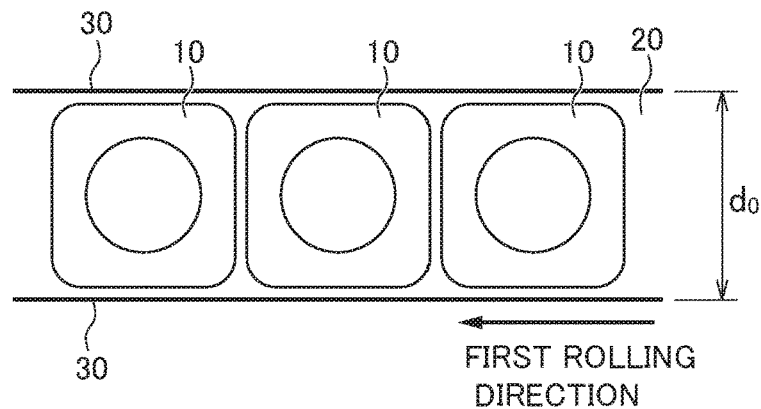
FIG. 2A is a view illustrating stamping out of first stator cores of a second embodiment.

The method of producing a stator 1 of a second embodiment will be explained. FIG. 2A is a view illustrating stamping out of first stator cores 10 of the second embodiment. As shown in FIG. 2A, the method for manufacturing the first stator cores 10 of the second embodiment is similar to the first embodiment.

Figure 2B:
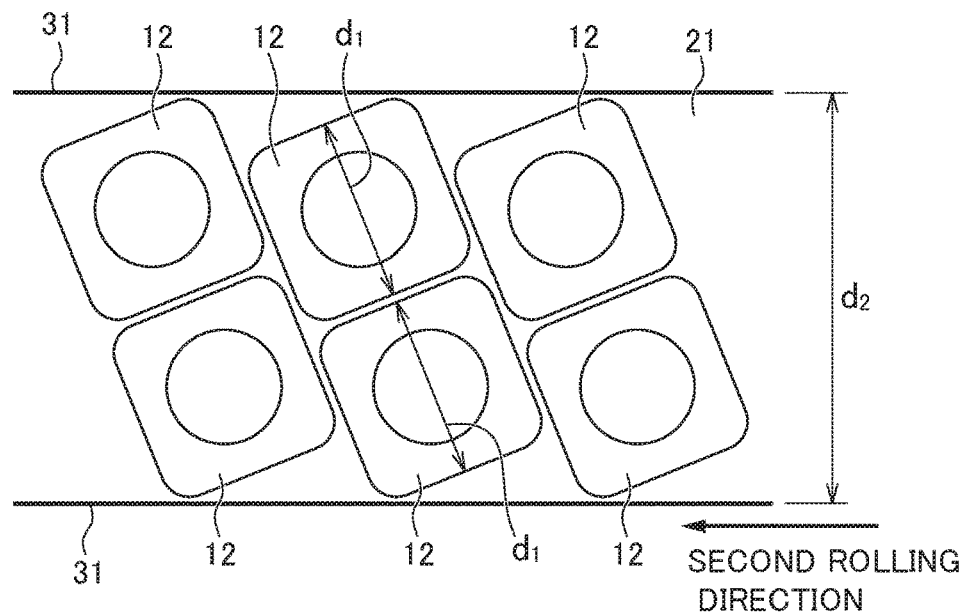
FIG. 2B is a view illustrating stamping out of second stator cores of the second embodiment.

FIG. 2B is a view illustrating stamping out of second stator cores 12 of the second embodiment. As shown in FIG. 2B, in the second embodiment, the positions of stamping out the second stator cores 12 in the second electromagnetic steel sheet 21 differ from the first embodiment. The positions of stamping out the second stator cores 12 in the second electromagnetic steel sheet 21 are set so that the shortest segments d1 of the second stator cores 12 are positioned on the same line for adjacent second stator cores 12 in the width direction.

Figure 2C:
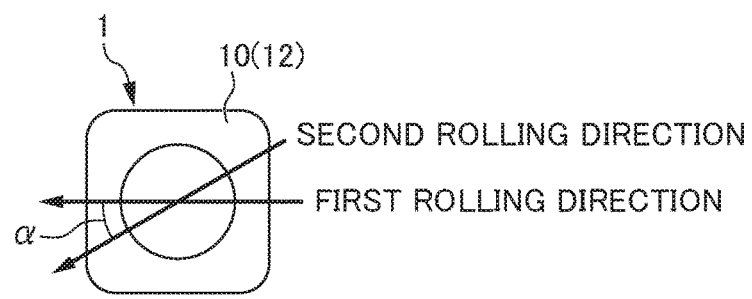
FIG. 2C is a view illustrating the relationship between the stator cores and the rolling directions of the second embodiment.

FIG. 2C is a view illustrating the relationship between the stator cores and rolling directions of the second embodiment. As shown in FIG. 2C, the angular difference between the first rolling direction of the first stator core 10 and the second rolling direction of the second stator core 12 is set to the angular difference α negating the magnetic anisotropy caused by the rolling direction, also in the second embodiment.

The second embodiment explained above also exerts effects similar to the first embodiment. In addition, in the second embodiment, since the segments d1 of each of the adjacent stator cores 12 in the width direction are positioned on the same line, it is possible to further decrease the width required in the second electromagnetic steel sheet 21. In addition, since it is possible to further narrow the interval between adjacent second stator cores 12 in the rolling direction, the manufacturability can be remarkably improved.

Next, an embodiment forming the stator 1 by laminating stator cores stamped out from the same electromagnetic steel sheet will be explained. It should be noted that, in the following explanation, the same reference symbols are assigned to configurations which are similar to configurations explained in the aforementioned embodiments, and explanations thereof may be omitted.

Figure 3A:
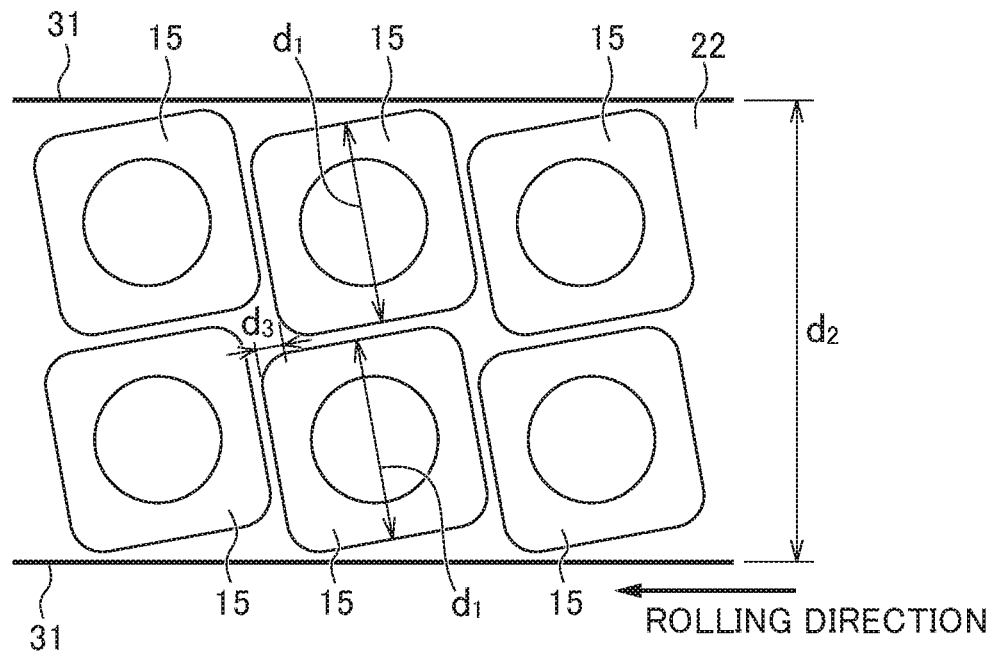
FIG. 3A is a view illustrating stamping out of stator cores of a third embodiment.
Figure 3B:
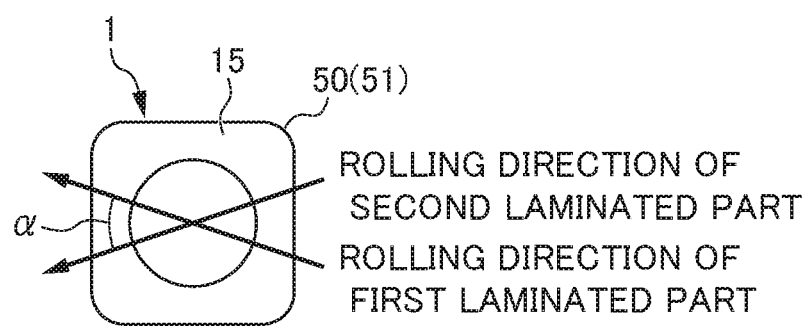
FIG. 3B is a view illustrating the relationship between the stator cores and the rolling directions of the third embodiment.

FIG. 3A is a view illustrating stamping out of stator cores 15 of a third embodiment. FIG. 3B is a view illustrating the relationship between the stator cores 15 and rolling directions of the third embodiment.

In the third embodiment, the point of laminating the stator cores 15 stamped out from an identical or same shape electromagnetic steel sheet 22 so as to suppress the influence of magnetic anisotropy differs from the first embodiment and second embodiment.

As shown in FIG. 3A, in the electromagnetic steel sheet 22 of the third embodiment, a plurality of pairs of two locations for stamping out the stator cores 15 alongside in the width direction is arranged in the rolling direction. For each of the stator cores 15, among the virtual segments linking opposite sides or diagonals passing through the center thereof, the orientations of the shortest segments d1 are aligned in the same orientation, i.e. in parallel.

In the third embodiment, a stator core 15 stamped out from the identical or same shape electromagnetic steel sheet 22 is laminated in a state turned upside down relative to a stator core 15 stamped out from the electromagnetic steel sheet 22. A part made by laminating the stator core 15 in a state retaining the orientation as stamped out from the electromagnetic steel sheet 22 is defined as a first laminated part 51, and a part made by turning upside down from the state stamped out from the electromagnetic steel sheet 22, i.e. part flipping over both sides, is defined as a second laminated part 52. It should be noted that the first laminated part 51 and second laminated part 52 may be both be one sheet, or may be pluralities of sheets.

As shown in FIG. 3B, when laminating the stator cores 15, the orientation of the segment d1 and/or the turned upside down orientation of the stator core 15 of the second laminated part 52 is set so that the rolling directions of the first laminated part 51 and second laminated part 52 form a predetermined angular difference $\alpha$. The angular difference $\alpha$ is an angular difference which suppresses the magnetic anisotropy caused by the rolling direction explained in the first embodiment, and the influence of magnetic anisotropy of the stator is suppressed by laminating the first laminated part 51 and second laminated part 52.

In the method of manufacturing a stator of the third embodiment explained above, the positions of stamping out the stator cores 15 are set so that the angular difference between the respective rolling directions becomes 360°÷(4× motor pole pair number) when laminating the stator core 15 which is not circular stamped out from the electromagnetic steel sheet (first laminated part 51) and the stator core 15 in a state turning upside down a stator core 15 stamped out from the electromagnetic steel sheet 22 (second laminated part 52). For the stator cores 15, among the virtual segments linking opposite sides or diagonals passing through the center thereof, the orientation of the shortest segment d1 is not orthogonal relative to the rolling direction, and at least two are stamped out alongside in the width direction.

It is thereby possible to suppress the scrap amount of the electromagnetic steel sheet 22 relative to the production amount of stator cores 15, compared to a case of stamping out all of the stator cores aligned in one row in the rolling direction of the electromagnetic steel sheet, and thus a reduction in manufacturing cost can be realized. In addition, it is possible to manufacture the stator cores 15 constituting the first laminated part 51 and the stator cores 15 constituting the second laminated part 52 from the identical or same shape electromagnetic steel sheet 22. Therefore, it is possible to efficiently manufacture high-quality stators in which the stator cores 15 are laminated at the angular difference $\alpha$ which suppresses the influence of magnetic anisotropy caused by the rolling direction, while simplifying the manufacturing process.

In addition, in the adjacent stator cores 15 in the width direction of the third embodiment, each of the shortest segments d1 of the stator cores 15 become a parallel positional relationship.

It is thereby possible to narrow the width of the electromagnetic steel sheet 22 by aligning the orientations of the stator cores 15, and thus more stator cores 15 can be manufactured from a limited region.

Figure 4A:
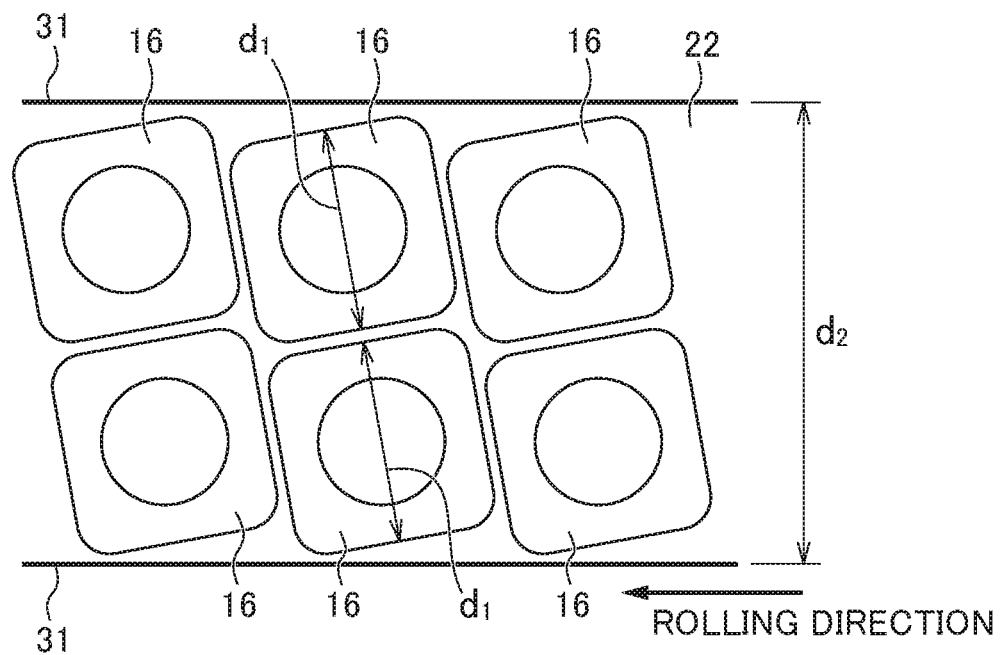
FIG. 4A is a view illustrating stamping out of stator cores of a fourth embodiment.
Figure 4B:
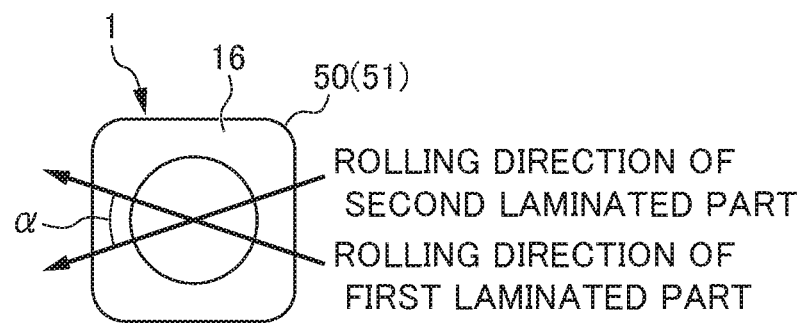
FIG. 4B is a view illustrating the relationship between the stator cores and the rolling directions of the fourth embodiment.

Next, a method of manufacturing stator cores of a fourth embodiment will be explained. FIG. 4A is a view illustrating stamping out of stator cores 16 of a fourth embodiment. FIG. 4B is a view illustrating the relationship between the stator cores 16 and rolling directions of the fourth embodiment.

In the fourth embodiment, the positions of stamping out the stator cores 16 in the electromagnetic steel sheet 22 differ from the third embodiment. As shown in FIG. 4A, the positions of stamping out the stator cores 16 in the electromagnetic steel sheet 22 are set so that the shortest segments d1 of the stator cores 16 are positioned on the same line for adjacent stator cores 16 in the width direction.

As shown in FIG. 4B, for the stator cores 16 stamped out from the electromagnetic steel sheet 22, a part made by laminating the stator core 16 in a state retaining the orientation as stamped out from the electromagnetic steel sheet 22 is defined as the first laminated part 51, and the stator core 16 turned upside down from the state stamped out from the electromagnetic steel sheet 22 is defined as the second laminated part 52, similarly to the third embodiment. Then, the positions of stamping out the stator cores 16 on the electromagnetic steel sheet 22 are set so as to make a predetermined angular difference $\alpha$ in a state laminating this first laminated part 51 and second laminated part 52.

The fourth embodiment explained above exerts similar effects as the third embodiment. In addition, since the segment d1 of each of the adjacent stator cores 16 in the width direction is positioned on the same line in the fourth embodiment, it is possible to further decrease the width required in the electromagnetic steel sheet 22. In addition, since it is possible to further narrow the interval between adjacent stator cores 16 in the rolling direction, the manufacturability can be remarkably improved.

Although preferred embodiments of the present invention have been explained above, the present invention is not to be limited to the aforementioned embodiments, and modifications where appropriate are possible. For example, the second stator cores 11, 12 and stator cores 15, 16 arranged in sub-columns in the aforementioned embodiments are two rows; however, they can also be configured as three columns. In addition, although the orientations of the segments d1 of the stator cores are all parallel in the aforementioned embodiments, they can be modified as appropriate according to the situation such as slanting a part of them in a different orientation.

EXPLANATION OF REFERENCE NUMERALS 1 stator
10 first stator core
11, 12 second stator core
15, 16 stator
20 first electromagnetic steel sheet
21 second electromagnetic steel sheet
22 electromagnetic steel sheet
d1 segment

What is claimed is:

1. A method for manufacturing a stator of a motor, the method comprising:

first stamping a first stator core from a first electromagnetic steel sheet, which extends in a first rolling direction, second stamping a second stator core from a second electromagnetic steel sheet, which extends in a second rolling direction, and laminating the first stator core and the second stator core to form the stator of the motor, prior to the first stamping and the second stamping, setting a first position of the first stator core and a second position of the second stator core so that, during the laminating, an angular difference between the first rolling direction and the second rolling direction equals 360 degrees divided by a product of four times a motor pole pair number of the motor, prior to the first stamping, for the first stator core, aligning a location of the first electromagnetic steel sheet at which the first stator is stamped out in one row in the first rolling direction in which the first electromagnetic steel sheet extends, and setting a positional relationship in which an orientation of a shortest segment, among virtual segments linking opposite sides or diagonals by passing through a center of the first stator core, is orthogonal to the first rolling direction, and prior to the second stamping, for the second stator core, aligning a location of the second electromagnetic steel sheet at which the second stator is stamped out in two rows in the second rolling direction in which the second electromagnetic steel sheet extends, and setting a slope relative to a width direction of a shortest segment among virtual segments linking opposite sides or diagonals which pass through a center of the second stator core, so that the angular difference is produced.

2. The method for manufacturing the stator according to claim 1, further comprising positioning each of the shortest segments of the first stator cores or the second stator cores which are adjacent in the width direction to be parallel.

3. The method for manufacturing the stator according to claim 1, further comprising positioning each of the shortest segments of the second stator cores which are adjacent in the width direction on a same line.

* * * * *